3,377,296
FLEXIBLE POLYURETHANE FOAMS
Frank J. Dwyer, Buffalo, and Herman Stone, Tonawanda,
N.Y., assignors to Allied Chemical Corporation, New
York, N.Y., a corporation of New York
No Drawing. Continuation-in-part of application Ser. No.
187,229, Apr. 13, 1962. This application Nov. 13, 1962,
Ser. No. 237,372
5 Claims. (Cl. 260—2.5)

This application is a continuation-in-part of our copending application Ser. No. 187,229, filed Apr. 13, 1962, now abandoned.

This invention relates to novel flexible urethane cellular products and to the preparation thereof. More particularly, this invention relates to flexible urethane foams characterized by low load bearing and low resiliency properties and to processes for the preparation of such foams.

Flexible urethane cellular products have become important in such fields of application as cushioning in furniture and automotive construction, sponges, bedding, such as pillows and mattresses, clothing interlining and the like. Particularly in such applications wherein the flexible product is utilized to provide comfort, the softness and low resiliency of certain urethane foams are desirable and valuable assets.

Cellular urethane products are generally prepared by reacting an organic polyisocyanate with an active hydrogen containing material, e.g. a polyester, polyester-amide or polyglycolether, in the presence of a blowing agent, e.g. water or a fluorinated hydrocarbon. From cost considerations, the most expensive ingredient in the usual foam formulation is the polyisocyanate and it would be desirable to limit the relative amount of such ingredient as much as possible without sacrifice of physical properties of the resulting foam product.

Previous attempts at preparing ultra soft flexible urethane foams with desirable properties have been only moderately successful. Thus, attempts to produce foams derived from polyesters and polyisocyanates, wherein less than the theoretical amount of polyisocyanate was used, resulted in products which deteriorated relatively fast under normal room conditions. It is also known that foams prepared from bifunctional polyglycolethers and less than stoichiometric amounts of polyisocyanate are deficient in their resistance to water and organic solvents. Further, the use of large quantities of blowing agent to provide foams of low density, below 1 lb./cu.ft. gives products of poor physical properties, e.g., hydrolytic stability, dimensional stability, abrasive resistance, and the like.

It is, therefore, an object of the present invention to devise flexible urethane cellular products characterized by softness and low resiliency.

A further object is to provide a process for preparing flexible urethane cellular products of desirable physical properties in which less than the stoichiometric amount of polyisocyanate is used.

These and other objects will be obvious from the following description of the present invention.

The novel urethane foams of this invention comprise the products obtained by reacting an organic polyisocyanate with a polyfunctional polyether, preferably a trifunctional polyether, having a hydroxyl number between 70 and about 350 and an equivalent weight of less than about 800, in the presence of water, the amounts of polyisocyanate and polyether being such that the composition has a ratio of isocyanato groups to active hydrogen-containing groups (present in the polyol and in the water) ("NCO/(H) index") of less than 0.9:1, and preferably between 0.5 to 0.75:1 and the amount of water used is such that a theoretical urea/urethane ratio of less than 3 and preferably between 1 and 2 to 1 is obtained.

In the manufacture of flexible urethane foams and especially polyether foams by the so-called "one shot" technique, it is currently the practice to combine the isocyanato- and active hydrogen-containing reactants in substantially equivalent amounts. The polyols used are of relatively high molecular weight and of relatively low hydroxyl number, it being the general purpose to produce a polymer with a maximum of chain extension and a minimum of cross links. Thus it has been the practice of this art to use polyethers especially polyether triols of molecular weight of about 3000 to 5000 and a hydroxyl number of about 30 to 70. Mixtures of such triols with varying amounts of diols of molecular weight of approximately 2000 and hydroxyl number of about 60 are sometimes used to obtain improved physical properties over those obtainable with triols.

In general the more linear in character the polymer chains are, the more flexible is the foam. Also, the more linear the foam, the less the load bearing characteristics.

Load bearing, in general, can be controlled by
(1) The density of cross links or potental cross link sites, and
(2) The stiffness of the linear polymer chains.

Density of cross link sites is directly related to the functionality and hydroxyl number of the polyether as discussed above. Thus a triol will give one cross link per unit, a tetrol will give two cross links per unit, etc. Further potential cross link sites are provided by the active hydrogens in such moieties as the urethane and urea links in the linear portion of the molecule. It is believed that the urea links provide greater stiffening of the linear chain than urethane links. The ratio of urea to urethane linkages is an important consideration in producing flexible foams resistant to hydrolytic cleavage. For example, in a foam formulation using 100 parts of a trifunctional 3000 molecular weight polyol and 3 parts of water, the ratio of urea groups to urethane groups would approach 3.3 to 1.

100 parts of 3000 M.W. triol=0.1 equiv.
3 parts of water=0.33 equiv.

Theoretically in such a formulation for each urethane group there would be present about three urea links. Such a ratio was considered to be minimal to obtain a flexible foam of good load bearing quality and acceptable hydrolytic stability. It was known further that satisfactory foams could be prepared using approximately stoichiometric amounts of isocyanato- and active hydrogen-containing components. The use of less than stoichiometric amounts of isocyanate gave foams which were very friable and failed to cure (Union Carbide Technical Service Bulletin, September 1959, page 3). It was, therefore, a general belief in art that use of substantially stoichiometric amounts of isocyanato- and active hydrogen-containing components was a "sine qua non" in the production of cellular urethanes.

When using this technology with triols of relatively high hydroxyl number and/or relatively low molecular weight, with the stoichiometric amounts of isocyanate, foams are obtained which are more rigid in character, due to shorter chain length of the polymer and greater density of cross links.

It was highly surprising to discover that by reducing the ratio of NCO to active hydrogen-containing groups to below the stoichiometric requirement, that is NCO/(H) index of below 0.9:1, stable flexible foams could be produced with polyols having hydroxyl numbers above 70. Furthermore, extremely soft foams were obtainable by controlling the relative amount of water used, i.e., by producing a foam having a theoretical urea/urethane ratio of less than 3:1. At this low ratio, the foams produced possess a surprising degree of hydrolytic stability.

For example, in the preparation of a foam from a triol having a molecular weight of about 1000 and 3 parts of water, the theoretical urea/urethane ratio of 1.1:1 is obtained.

100 parts triol=0.3 equiv.
3 parts water=0.33 equiv.

Further, using these proportions and sufficient diisocyanate to give an NCO/H index of 0.7, a very soft stable foam is produced, which is stable under humid conditions.

Thus it can be seen that there are three variables in the formulation of foams of the character discussed herein. These variables are:

(1) hydroxyl number of the polyol
(2) NCO/(H) index
(3) urea/urethane ratio.

The combination of these three variables in accordance with the present invention gives desirable characteristics of foam stability, softness and hydrolytic stability.

Although it is not known with certainty how this desirable result is obtained, it is believed that the presence in the polyol component of the extra functionality and the relatively low molecular weight thereof provides a sufficient number and density of cross-linking sites to endow the finished product with adequate strength and stability. It is believed also that the urea linkages provided by the reaction of water and isocyanato groups contributes to this strength and stability. Thus the stable polymeric product results by careful adjustment of the polyol, isocyanate and water components when the polyol used has a hydroxyl number of at least 70 and an equivalent weight in the range of 180 to about 800. The amount of polyisocyanate used is such as to provide an NCO/(H) index of less than 0.9:1 and the amount of water used is sufficient to provide less than a calculated ratio of three urea groups for each urethane linkage.

According to a preferred mode of preparing the novel flexible urethane foams of this invention, a mixture of the polyol and ancillary reactants such as catalysts, emulsifiers and the like is prepared and then combined with the separate streams of organic polyisocyanate and blowing agent in a conventional continuous foaming machine. The foaming mixture is sprayed or otherwise directed into a suitable mold and permitted to set therein. The product is cured by standing at ambient temperature for a period of days or by heating in an oven at about 150° C. for a period of minutes.

The polyethers suitable for use in the present invention are polymers or addition products of alkylene oxides and polyfunctional alcohols. Examples of such alkylene oxides are ethylene oxide, propylene oxide, butylene oxide and mixtures thereof. Examples of suitable polyfunctional alcohols include glycerin, trimethylolpropane, hexanetriol, pentaerythritol. These polyethers are prepared in a well known manner and are selected to have an equivalent weight below about 800, preferably between about 280 and about 560 and a hydroxyl number of at least 70 and at most 350, preferably within the range of 100 and 200. The preferred polyethers are also trifunctional, i.e., they have three active hydrogen-containing groups. Mixtures of two or more polyether polyols in which one or more of the components have a hydroxyl number outside the above indicated range but in which the average hydroxyl number of the mixture is within the range of 70 to 350, can also be used.

In the preparation of the novel cellular polyurethanes of this invention, any of a wide variety of polyisocyanates can be used. The liquid polyisocyanates and especially liquid diisocyanates are preferred. As examples of this component, the following can be mentioned:

m-phenylene diisocyanate
2,4-tolylene diisocyanate
2,6-tolylene diisocyanate
naphthalene-1,5-diisocyanate
methylene-bis-(4-phenylsiocyanate)
methylene-bis(4-cyclohexylisocyanate)
1,6-hexamethylene diisocyanate
4,4',4''-triphenylmethane triisocyanate
1,3,5-benzene triisocyanate Mixtures of the above polyisocyanates and equivalent materials are contemplated also.

The amount of polyisocyanate used to react with the active hydrogen containing substances (the polyol and the water at least) is governed by at least two factors:

(a) The hydroxyl number of the polyol used.
(b) The NCO/(H) index selected.

The hydroxyl number of the polyol used in this formulation can, as indicated above, vary from about 70 to about 350. We have found and it is an additional feature of our invention, that as the hydroxyl number of the polyol increases the NCO/(H) index must be decreased in order that the flexible character of the resultant form be preserved, and correspondingly, as the hydroxyl number of the polyol decreases the NCO/(H) index is increased in order to obtain a foam of satisfactory quality, the standards of which are subject to some deviation according to the desired end use of the foam, personal preference and the like. From this index, the amount of polyisocyanate can be calculated according to the expression $$\frac{\text{wt. of polyisocyanate}}{\text{Equiv. wt. of isocyanate}} = \frac{\text{wt. of polyol}}{\text{equiv. wt. of polyol}} + \frac{\text{wt. of water}}{9}$$

For a triol of average molecular weight of 1000 (approximate) and a hydroxyl number of about 160, an NCO/(H) index of from 0.5 to 0.7 will provide satisfactory flexible foam. The exact amount of polyisocyanate used will depend upon the amount of water added (this as is evident, contributing to the active hydrogens available for reaction with the isocyanate component) which, as indicated below, may be varied depending upon the softness of the foam desired.

Similarly when the polyol has a hydroxyl number of 100 the NCO/(H) index will lie between about .75 and .85, while for polyols having a hydroxyl number of 250, the NCO/(H) index will lie between about .3 and .4. In all instances an NCO/(H) index below 0.9 will be required to obtain a flexible foam and the greater the hydroxyl number of the polyol the less will be this index value.

Water serves a dual function in the preparation of the novel urethane compositions. Not only does it function by reaction with free isocyanato moieties to provide a gaseous reaction product in the viscous gelling mass and thereby to induce the formation of the cellular structure but also by the same reaction it provides a source of urea linkages, which, as indicated above, contribute to the strength and stability of the resultant cellular structure. As the hydroxyl number of the polyol increases, the minimum equivalent quantity of water required to provide a foam stable under humid conditions decreases. Increasing the water used above this minimum amount results in stiffer foams and hence the water used should be at or near this minimum quantity in order to provide the softest foam consistent with hydrolytic stability. Similarly as the NCO/(H) index is varied the equivalent quantity of water to be used varies in direct proportion. The amount of water used in the process to form a flexible foam using a triol of 1000 molecular weight and of 160 hydroxyl number and NCO/(H) index of 0.5 to 0.7 can be varied from about 3 to about 4 parts of water per 100 parts (by weight) of polyol. The use of less than 3 parts of water gives a cellular product of poor hydrolytic stability. Foams prepared using more than about 4 parts of water possess progressively unsatisfactory physical characteristics, i.e., stiffness, uneven texture, poor tear strength and the like, and for this reason use of such excesses of water is to be avoided. It will be evident that the practical amount of water which can be added can be varied somewhat from the minimum necessary to provide the desired degree of hydrolytic stability to the resultant foam, which will depend to some extent upon personal preference and the end use of the resultant foam. Inasmuch as this minimum amount of water varies somewhat (in inverse order) as the hydroxyl number of the polyol used varies and to a lesser extent as the NCO/(H) index varies, and also in accordance with the degree of softness desired (the more water used the stiffer the foam), the practical concentration of water to be employed in a specific formulation may be readily determined.

The density of the flexible urethane product can be controlled to some extent by the use of up to about 20 parts of an auxiliary blowing agent, per 100 parts of polyether. Such an auxiliary blowing agent is a fluorinated saturated aliphatic hydrocarbon, such as for example, one or a mixture of the following trichloromonofluoromethane
dichlorodifluoromethane
monochlorotrifluoromethane
trichlorotrifluoroethane
dichlorotetrafluoroethane
tetrachlorodifluoroethane
1,1 difluoroethane
1,1,1 trichlorodifluoroethane These halogenated hydrocarbons are characterized by being liquids or easily liquefiable gases at normal temperatures and pressures, being poor solvents for the organic polymer, boiling at temperatures below what generated by the polymerization reaction, a temperature not usually in excess of about 175° C., and particularly being non-reactive with any of the components of the reaction mixture. These agents have a significant miscibility with either the polyol or the polyisocyanate components and hence can be added together with that component as a solution therein.

The polymerizable compositions of this invention may and usually do contain ingredients other than above indicated polyisocyanates, polyether and blowing agents. Thus such adjuvants as emulsifiers, polymerization catalysts, activators or accelerators, pigments, fillers, extenders, fire retardant agents and the like can be and usually are present.

The catalyst, accelerator or activator is used to promote or otherwise regulate the polymerization reaction. Tertiary amines such as triethylamine, dimethylethanolamine, pyridine, quinoline, N-alkyl morpholines, triethylenediamine and the like are commonly used. Organic tin compounds, such as dibutyltin dilaurate, tributyltin octanoate, bis(2-ethylhexyl) tin oxide, dibutyltin dichloride, tin hexanoate, stannous octoate and the like are sometimes used alone or as accelerators in conjunction with a tertiary amine catalyst, especially in the so-called "one-shot" foam procedure. The amounts of such catalysts used can be from about 0.1% to 12% or more by weight based on the weight of the polyol. The catalyst can be introduced at any convenient time although it is usually added to the polyether component prior to reaction thereof with the isocyanato component.

Emulsifying agents are used, if desired, to improve the intermixing of the polyether and polyisocyanato components which are usually mutually insoluble. The polymerization occurring rapidly as it does is assisted by vigorous intermixing of the components and also by the use of emulsifying agents. Any of a number of known agents of this character can be used. However, we prefer to employ siloxane-oxyalkylene block copolymers which have the general formula

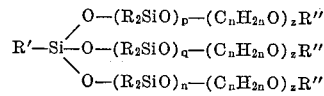

in which R, R' and R'' are $C_{1-18}$ alkyl radicals, $p$, $q$ and $n$ are integers 2 to 15 and $—(C_nH_{2n}O)_z—$ is a polyalkylene block which is preferably a polyoxyethylene-polyoxypropylene block containing from 10 to 50 of each oxyalkylene unit. Block copolymers of this type are disclosed in U.S. Patent 2,834,748.

Siloxane-oxyalkylene block copolymers are commercially available, one such being marketed under the trade designation, "Silicone L520" which has the structure described by the above general formula in which $R=CH_3$, $R'=C_2H_5$, $R''=C_4H_9$, $p=q=n=7$ and the block,

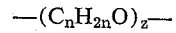

is a polyoxyethylene-polyoxypropylene block containing 50 units of each oxyalkylene moiety.

Other emulsifying agents can be used and as typical of such agents polyethylene phenol ether, blends of polyalcohol carboxylic acid esters, oil soluble sulfonates, lecithin and the like can be mentioned.

The following examples will illustrate the present invention. Parts and percentages are by weight and temperatures are given in degrees centigrade, unless otherwise specified.

EXAMPLE I

A mixture consisting of 100 parts of Polyether G–168 (a glycerin initiated polyoxy propylene triol of hydroxyl number of 168 and average mol. wt. of 1000) and 0.2 part stannous octoate, was prepared. This premix was used to make a foam by combining it in a conventional three-steam foam machine with a mixture of 4 parts of water, 0.1 part of triethylenediamine and 2.0 parts of "Silicone L-520" and 42.7 parts of an 80–20 mixture of 2,4- and 2,6-tolylene diisocyanates hereinafter referred to as TDI. The machine operated at 25 lbs./minute and the delivery rates were as follows:

|  | Parts/5 sec. |
|---|---|
| Premix | 634 |
| "TDI" | 274 |
| Water | 38.3 |

The foam was cured for ½ hour at 157°.

The NCO/(H) index of this foam was 0.66.

Two similar foams were prepared in which the same proportions of reactants were used but in which 7.5 parts and 15 parts of trichloromonofluoromethane were added, admixed with the diisocyanate stream, to the foaming mixture. These two foams were cured for 1 hour instead of ½ hour at 157°.

The physical characteristics of these foams were determined according to the methods described in ASTM-D–1564–59T except as indicated below. A comparison of the characteristics of the three foams prepared above is set out in Table I below.

TABLE I

| Characteristic | Foam A (0 parts Genetron) | Foam B (7.5 parts Genetron) | Foam C (15 parts Genetron) |
|---|---|---|---|
| Density (lb./cu. ft.) | 1.5 | 1.3 | 1.1 |
| Tensile Strength (p.s.i.) | 9 | 11 | 10 |
| Elongation (percent) | 340 | 360 | 340 |
| Tear Strength (p./i.) | 1.4 | 1.6 | 1.3 |
| Compression Load (p.s.i.) at— | | | |
| 25% | 0.10 | 0.09 | 0.09 |
| 50% | 0.13 | 0.11 | 0.10 |
| 65% | 0.18 | 0.15 | 0.15 |
| Rebound at 75% Penetration (percent) * | 22 | 25 | 23 |
| Compression Set: | | | |
| 90% 22 hours (percent) | 15 | 38 | 24 |
| 90% 6 hrs (percent) | 10 | 12 | 10 |
| Indentation Load (15"×15"×4") at— | | | |
| 25% (lbs.) | 11 | 10 | 8 |
| 50% | 15 | 13 | 11 |
| 65% | 20 | 17 | 14 |
| 25% (return) | 7 | 6 | 5 |

* Standard Test Method FF-TM-6 National Aniline Division of Allied Chemical Corporation, Technical Bulletin TS-9 (1961).

These data indicated that at this low NCO/(H) index the tensile-strength, elongation and tear strength characteristics were acceptable and in addition an ultra soft foam (as indicated by the low indentation load) having good hydrolytic stability was produced.

EXAMPLE II

In a similar manner to that described in Example I above, a urethane foam was prepared and tested. This foam differed from that prepared above only in the use of more "TDI" (45.2 parts) and thus the NCO/(H) index of 0.7:1 attained in this instance. The characteristics of this product are given in Table II.

TABLE II

| | |
|---|---|
| Density | 1.6 |
| Tensile strength | 13 |
| Elongation | 380 |
| Tear strength | 2.0 |
| Compression load at, percent: | |
| 25 | 0.14 |
| 50 | 0.17 |
| 65 | 0.25 |
| Compression set: | |
| 90% 22 hr. | 80+ |
| 90% 6 hr. | 14 |
| Rebound | 20 |
| Indentation load at— | |
| 25% | 12 |
| 50% | 17 |
| 65% | 22 |
| 25% return | 8 |

Units of tests in Table II and following tables are the same as in Table I.

EXAMPLE III

A premix consisting of 100 parts of a polyether triol having an average molecular weight of about 1075 and a hydroxyl number of approximately 157, and 0.2 part stannous octoate was combined in a conventional three-stream foam machine with 44.2 parts of "TDI" and a mixture of 4 parts of water and 0.1 part triethylenediamine and 2.0 parts of "Silicone L-520" (NCO/(H) index of 0.7:1).

The machine operated at the rate of 22 lbs./minute and the streams were fed at the following rates (parts/5 seconds).

| | |
|---|---|
| Premix | 550 |
| "TDI" | 248 |
| Water | 33.6 |

Similar foams were prepared in which varying amounts of trichloromonofluoromethane were added to the foam (admixed with the isocyanate component).

The foams, after curing, were tested as before and the results of these tests are set out for comparison in Table III below.

TABLE III

| Characteristic | 0 | 5 | 10 | 15 | 20 |
|---|---|---|---|---|---|
| Density | 1.5 | 1.4 | 1.2 | 1.03 | 0.98 |
| Tensile Strength | *15–12 | 13–10 | 10–9 | 10–8 | 8–8 |
| Elongation | 310–320 | 330–370 | 310–340 | 390–340 | 270–320 |
| Tear Strength | 1.7–1.5 | 1.7–1.4 | 1.5–1.3 | 1.4–1.0 | 1.2–1.1 |
| Compression Load at— | | | | | |
| 25% | 0.15–0.10 | 0.13–0.07 | 0.10–0.06 | 0.08–0.07 | 0.7–0.05 |
| 50% | 0.19–0.13 | 0.15–0.09 | 0.12–0.07 | 0.10–0.08 | 0.08–0.06 |
| 65% | 0.27–0.20 | 0.20–0.14 | 0.16–0.11 | 0.13–0.10 | 0.11–0.08 |
| Compression Set (90%): | | | | | |
| 22 hr | 6–23 | 10–18 | 10–14 | 12–36 | 11–14 |
| 6 hr | 10–21 | 10–14 | 10–12 | 6–18 | 6–8 |
| Rebound | 25 | 23 | 25 | 26 | 28 |
| Indention Load: | | | | | |
| 25% | 13 | 11 | 9 | 14 | 11 |
| 50% | 17 | 15 | 12 | 19 | 15 |
| 64% | 22 | 19 | 16 | 24 | 19 |
| 25% (return) | 8 | 7 | 6 | 9 | 7 |

*Data indicated by second number represents value after standard humid aging test 5 hours 120° at 100% RH
These data indicate that the main effect of the added fluorocarbon was to reduce the density of the resultan foam without significant effect on the strength characteristics of the ultrasoft foam produced.

EXAMPLE IV

The formulation described in Example III above was adjusted to provide for varying amounts of water while maintaining the NCO/(H) index constant at 0.7:1. The amounts of reactants used in the preparation of three such foams to illustrate the effect of varying the amount of water is given below:

| | Foam A | Foam B | Foam C |
|---|---|---|---|
| Water parts | 3 | 3.5 | 4.0 |
| "Nacconate 80", parts | 37.4 | 40.6 | 44.2 |

All three foams were prepared in the foam machine using a delivery rate of 22 lbs./minute. The three streams were mixed at the following rates:

| | Foam A | Foam B | Foam C |
|---|---|---|---|
| Premix (parts/5 seconds) | 585 | 571 | 555 |
| "Nacconate 80" (parts/5 seconds) | 218 | 231 | 245 |
| Water (parts/5 seconds) | 29.7 | 31.9 | 33.7 |

The resultant foams were cured and then tested for strength and softness characteristics. The results are given in the following Table IV.

TABLE IV

| Characteristics | Foam A | Foam B | Foam C |
|---|---|---|---|
| Density | 1.97 | 1.59 | 1.35 |
| Tensile Strength | 9—*7 | 7—*5 | 10—*6 |
| Elongation | 190—*210 | 220—*260 | 180—*200 |
| Tear Strength | 1.2—*1.1 | 1.2—*1.0 | 1.2—*1.1 |
| Indentation Load: | | | |
| 25% | 9 | 10 | 9 |
| 50% | 12 | 13 | 13 |
| 65% | 16 | 17 | 15 |
| 25% return | 6 | 6 | 6 |

*After humid Aging Test 5 hrs., 120°, 100% RH.

EXAMPLE V

The procedure of Example 1 was repeated using a mixture of a glycerin-initiated polyoxypropylene triol having a hydroxyl number of 100, and an average molecular weight of 1683 and 0.28 part of stannous octoate as the premix, and using 3.6 parts instead of 4 parts of water.

The NCO/(H) index of this foam was 0.85/1.
The urea/urethane ratio was 2.2/1.

(3.6/9:100/1683/3=0.4:0.18)

The physical characteristics of the resultant foam are given in Table V below (follows Ex. VI).

EXAMPLE VI

In a similar manner to that described in Example V above, except that in place of 100 parts of the triol a mixture of 50 parts of a triol having a hydroxyl number of 56 and 50 parts of a triol having a hydroxyl number of 160 were used. The polyether mixture thus had an "average hydroxyl number" of about 100.

The NCO/(H) index and urea/urethane ratio of this foam was approximately the same as for the foam of Example V.

The physical characteristics of this foam are given in Table V below.

TABLE V

| Characteristic | Foam of Ex. V | Ex. VI |
|---|---|---|
| Density | 1.7 | 1.6 |
| Tensile Strength | 15 | 14 |
| Elongation | 230 | 230 |
| Tear Strength | 1.8 | 2.0 |
| Rebound | 36 | 28 |
| Indentation Load at— | | |
| 25% | 17 | 18 |
| 50% | 23 | 27 |
| 65% | 30 | 36 |
| 25% return | 12 | 11 |

Both of these foams possessed acceptable hydrolytic stability.

EXAMPLE VII

The procedure of Example I was repeated using a mixture of 100 parts of a glycerin initiated polyoxypropylene triol having a hydroxyl number of 125, and an average molecular weight of about 1350, and 0.24 part stannous octoate as the premix and 3.0 parts instead of 4 parts of water.

The NCO/(H) index of this foam was 0.8/1.
The urea/urethane ratio was 1.5/1.

The physical characteristics of the resultant foam are given in Table VI below (follows Ex. VIII).

EXAMPLE VIII

In an analogous manner to that described in Example VII above, except that in place of 100 parts of the triol, a mixture of 58 parts of a triol having a hydroxyl number of 56 and 42 parts of a triol having a hydroxyl number of 160 were used. The polyether mixture used thus had an "average hydroxyl number" of about 122.

The physical characteristics of this foam are given in Table VI below.

TABLE VI

| Characteristic | Foam of Ex. VII | Foam of Ex. VIII |
|---|---|---|
| Density | 2 | 1.9 |
| Tensile Strength | 12 | 14 |
| Elongation | 230 | 210 |
| Tear Strength | 1.5 | 1.6 |
| Rebound | 30 | 27 |
| Indentation Load at— | | |
| 25% | 16 | 17 |
| 50% | 24 | 25 |
| 65% | 32 | 34 |
| 25% return | 10 | 11 |

The hydrolytic stability of both these foams was good.

The data show that soft foams of excellent properties can be made using less than the stoichiometric amount of polyisocyanate and a polyether triol of high hydroxyl number and low molecular weight or a mixture of triols having an average hydroxyl value somewhat higher than conventional triols used to prepare flexible urethanes.

Supersoft foams prepared by the process of the present invention are characterized by a "soft" feel and "cushion-ing" not achieved by known urethane technology and cannot be described by a single physical property. The supersoft foams of the present invention are particularly adapted for applications requiring low load bearing such as pillows, chair backs etc. whereas conventional foams are generally too "stiff" for these purposes. The foams herein described are characterized by the desirable low load bearing ability which can be achieved without addition of inert blowing agents thus making foams of higher density. Inert gases can be added to achieve lower density but this is not a necessary requisite to low load bearing. In addition the low load bearing does not wholly describe the "soft" feel of the foams of the present invention. This feel is composed of an interaction or combination of a number of physical properties. Properties which can be used to describe supersoft foams of the present invention are:

I. Density
II. Rebound resilience
III. Hysteresis
IV. Indentation load especially at low compressions
V. Stress relaxation

I. Density

The density of the foams are measured in terms of pounds per cubic foot and range generally from about 0.9 to about 2.0 pounds per cubic foot. These foams are classified as high density and low density with the latter having a density within the range of about 1.3 to about 2.0 pounds per cubic foot and the former having a density within the range of about 0.9 and less than 1.3 pounds per cubic foot. High density foams are generally produced without addition of inert blowing agents whereas lower density foams are achieved by the addition of inert blowing agents. Both high density and low density foams are characterized by the soft feel and cushioning effect but differ somewhat in their properties as shown below.

II. Rebound resilience

A preferred method for determining resilience consists of measuring percent resilience by a modified Goodyear Healy pendulum. In order to avoid misleading results due to hardness or due to the pneumatic effect of closed cells the resilience is measured at a constant 75% indentation (Nacco. Bull. TS–9(1961) Method FF–TM–6).

III. Hysteresis

This method is generally determined by either of two methods.

Method I.—An indentation load curve is drawn as the load is applied and as it is released. Hysteresis is the measure of a difference in area under these two curves. (Nacco. Bull. TS–9 Method FF–TM–5).

Method II.—Indentation load is measured as usual at 25% indentation after 1 minute rest (ASTM D–1564–59T). The load is then increased to produce higher indentation. Then the load is again reduced to produce 25% indentation. A comparison of the two 25% indentation load values is a measure of hysteresis.

IV. Indentation

This method is described in ASTM–D–1564–59T and is usually carried out at 25% and 65% indentations. Another value usually given is the 65%/25% ratio. In order to better characterize the soft feel of the supersoft foams, measurements were also made at 10% indentation.

V. Stress relaxation

It is a well known fact that when foam is compressed to a predetermined percent pressure a part of the load bearing ability is lost almost immediately i.e. in about 1 minute. For this reason the load value is usually reported after 1 minute rest (ASTM D–1564–59T). The change (Δ) during the rest period is a measure of stress relaxation and is unusually low for the foams of the present invention invention at low indentations.

The flexible urethane cellular structures having "soft"

feel and "cushioning" of high and low densities of the present invention are characterized by the following physical properties:

| Property | High Density | Low Density |
|---|---|---|
| Density (lbs./cu.ft) | 1.3–2.0 | 0.9–1.3 |
| Resilience (percent) | <40 | <35 |
| Hysteresis (percent) | <50 | <40 |
| Indentation Load: | | |
| 10% deflection (lbs.) | <14 | <11 |
| 25% deflection (lbs.) | <20 | <14 |
| Stress Relaxation at— | | |
| 10% deflection (lbs.) | <4.5 | <2 |
| 25% deflection (lbs.) | <7.0 | <3 |

It can thus be seen that an efficient and economical process for the production of strong, soft, flexible cellular urethane products has been devised and that such products, inasmuch as they utilize a relatively lesser proportion of the expensive isocyanate reactant, represent a highly desirable advance in the urethane art.

This invention discloses novel cellular urethane products and processes for preparing them, which are characterized by the use of less than the stoichiometric amount of polyisocyanate.

This disclosure has been amplified by several examples illustrating the basic nature of the invention. Obviously, other variations will be apparent to the skilled chemist and it is to be understood that such are intended to be included within the scope of this invention.

We claim:

1. A flexible urethane cellular structure characterized by the following physical properties:

| | |
|---|---|
| Density lbs./cu. ft. | 1.3–2.0 |
| Resilience _____percent__ | <40 |
| Hysteresis _____do____ | <50 |
| Indentation load, percent deflection: | |
| 10 _____lbs__ | <14 |
| 25 _____lbs__ | <20 |
| Stress relaxation at, percent deflection: | |
| 10 _____lbs__ | <4.5 |
| 25 _____lbs__ | <7.0 | obtained by a process which comprises mixing and co-reacting a polyfunctional polyether having 3 to 4 hydroxyl groups, a hydroxyl number in the range of 70 to 350, and an equivalent weight of about 180 to less than about 800, an organic polyisocyanate, and water, the amounts of polyisocyanate, polyfunctional polyether, and water being such that the ratio of isocyanato groups to active hydrogen-containing groups present in the polyfunctional polyether and in the water is about 0.3:1 to less than 0.9:1 and the amount of water is such to provide a urea/urethane ratio of about 1:1 to less than about 3:1.

2. A flexible urethane cellular structure characterized by the following physical properties:

| | |
|---|---|
| Density lbs./cu. ft. | 0.9–1.3 |
| Resilience _____percent__ | <35 |
| Hysteresis _____do____ | <40 |
| Indentation load, percent deflection: | |
| 10 _____lbs__ | <11 |
| 25 _____lbs__ | <14 |
| Stress relaxation at percent deflection: | |
| 10 _____lbs__ | <2 |
| 25 _____lbs__ | <3 | obtained by a process which comprises mixing and co-reacting a polyfunctional polyether having 3 to 4 hydroxyl groups, a hydroxyl number in the range of 70 to 350, and an equivalent weight of about 180 to less than about 800, an organic polyisocyanate, and water, the amounts of polyisocyanate, polyfunctional polyether, and water being such that the ratio of isocyanato groups to active hydrogen-containing groups present in the polyfunctional polyether and in the water is about 0.3:1 to less than 0.9:1 and the amount of water is such to provide a urea/urethane ratio of about 1:1 to less than about 3:1, and incorporating into the mixture, about 20 parts per 100 parts of polyfunctional polyether, a fluorinated saturated aliphatic hydrocarbon as an auxiliary blowing agent.

3. A process for the production of flexible urethane cellular structure which comprises mixing and co-reacting a polyalkyleneethertriol having a hydroxyl number in the range of 100 to 200 and an equivalent weight in the range of 280 to 560, an organic polyisocyanate, and water, the amounts of polyisocyanate, polyalkyleneethertriol and water being such that the ratio of isocyanato groups to active hydrogen-containing groups present in the polyalkyleneethertriol and in the water is in the range of 0.5:1 to 0.75:1 and the amount of water is such to provide a urea/urethane ratio in the range of 1:1 to 2:1.

4. A process for the production of flexible urethane cellular structure which comprises mixing and co-reacting a polyfunctional having 3 to 4 hydroxyl groups having a hydroxyl number in the range of 70 to 350 and an equivalent weight of about 180 to less than about 800, an organic polyisocyanate, and water, the amounts of polyisocyanate, polyfunctional polyether and water being such that the ratio of isocyanato groups to active hydrogen-containing groups present in the polyfunctional polyether and in the water is about 0.3:1 to less than 0.9:1 and the amount of water is such to provide a urea/urethane ratio of about 1:1 to less than 3:1.

5. A method as claimed in claim 4 wherein up to about 20 parts per 100 parts of polyfunctional polyether of a fluorinated saturated aliphatic hydrocarbon as an auxiliary blowing agent is incorporated in the mixture.

References Cited

UNITED STATES PATENTS 3,050,477  8/1962  Gmitter et al.
3,067,148  12/1962  Sandridge et al.

OTHER REFERENCES

Barringer, "Rigid Urethane Foams–11 Chemistry and Formulation," Du Pont Elastomers Chem. Dept. Bulletin HR–26; April 1958, page 49 (copy in group 140).

JAMES A. SEIDLECK, *Primary Examiner.*

LEON BERCOVITZ, DONALD CZAJA, *Examiners.*

F. McKELVEY, *Assistant Examiner.*

UNITED STATES PATENT OFFICE
CERTIFICATE OF CORRECTION

Patent No. 3,377,296                              April 9, 1968

Frank J. Dwyer et al.

It is certified that error appears in the above identified patent and that said Letters Patent are hereby corrected as shown below:

Column 5, line 53, "what" should read -- that --. Columns 7 and 8, TABLE III, column 1, line 13 thereof, "Indention Load" should read -- Indentation Load --; same column 1, line 16, "64%" should read -- 65% --; same TABLE III, column 6, line 5 thereof, "0.7-0.05" should read -- 0.07-0.05 --. Column 10, line 74, cancel "invention". Column 12, line 31, "polyfunctional having" should read -- polyfunctional polyether having --.

Signed and sealed this 9th day of September 1969.

(SEAL)
Attest:

Edward M. Fletcher, Jr.                        WILLIAM E. SCHUYLER, JR.
Attesting Officer                                 Commissioner of Patents